United States Patent
De Trana et al.

(10) Patent No.: US 6,633,638 B1
(45) Date of Patent: Oct. 14, 2003

(54) METHOD AND APPARATUS FOR A CUSTOMER SELF-PROVISIONING OF OUTPULSED DIGITS IN A TELECOMMUNICATION NETWORK

(75) Inventors: Nicholas D. De Trana, Addison, IL (US); Hossein Eslambolchi, Basking Ridge, NJ (US); James J. Gallagher, Lebanon, NJ (US); Diana L. Stipo, Flemington, NJ (US); Ellen D. Walbridge, Overland Park, KS (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/453,744

(22) Filed: Dec. 2, 1999

(51) Int. Cl.$^7$ .................................... H04M 3/42
(52) U.S. Cl. ............. 379/242; 379/246; 379/201.01; 379/201.02; 379/201.05
(58) Field of Search .................. 379/242, 201.12, 379/201.01, 201.02, 201.05, 198, 88.25, 245, 265.01, 265.11, 265.12, 265.13, 246

(56) References Cited

U.S. PATENT DOCUMENTS

| | | | | |
|---|---|---|---|---|
| 4,757,267 A | * | 7/1988 | Riskin ..................... 379/113 |
| 5,475,746 A | * | 12/1995 | Miller et al. ............. 379/201 |
| 5,915,008 A | * | 6/1999 | Dulman .................... 379/201 |
| 5,999,611 A | * | 12/1999 | Tatchell et al. .......... 379/211 |
| 6,031,904 A | * | 2/2000 | An et al. .................. 379/201 |
| 6,401,090 B1 | * | 6/2002 | Bailis et al. ................. 707/9 |

\* cited by examiner

Primary Examiner—William J. Deane, Jr.

(57) ABSTRACT

The invention allows a customer to self-provision the routing of non-geographic calls along a communication network. The customer is allowed to interface a computer with terminating switches and network control point databases so that routing information regarding the transmission of non-geographic calls across the communication network can be added, edited or reconfigured according to the customer's calling requirements. First, the customer accesses the communications network and requests a non-geographic number. Second, if the non-geographic number is available, the customer can input information regarding internal routing numbers or implement various calling schemes such as time of day calling. Third, the customer can access trunk information on terminating switches and modify the trunk names as requirements in the customer's communication network change. The customer self-provisioning capability eliminates tasks performed by the service provider, such as routing translations and routing arrangements, and allows the customer greater control and quicker responses to the implementation of routing changes, reduces cycle time for the introduction of new services and reduces costs for service providers.

16 Claims, 5 Drawing Sheets

METHOD AND APPARATUS FOR A CUSTOMER SELF-PROVISIONING OF OUTPULSED DIGITS IN A TELECOMMUNICATION NETWORK

FIELD OF THE INVENTION

This invention relates to a method and apparatus for a customer to remotely provision their telecommunication network. Specifically, the invention provides the customer with direct access, control and real-time support of the provisioning of internal routing numbers and outpulsed digits for non-geographic calls routed to the customer's communication equipment.

BACKGROUND

Currently, customer PBX technical detail data is collected by the sales and ordering process conducted by the telecommunication service provider. This information is routinely passed through a variety of processes and/or systems in the service provider's telecommunications network and provisioning systems, resulting in increased time delays, potentially allowing for defective provisioning data and adding to the cost overhead of the service provider. Under the current scheme, the service provider assigns non-geographic calling numbers, then assigns internal routing numbers and outpulsed digits at the terminating switch.

A need exists for a process where the service provider allows the customer controlled access to the databases located in the Network Control Point (NCP). By allowing the customer access to the databases supporting non-geographic calling, the service provider can offer the customer lower cost services, faster provisioning times and greater control over the incoming non-geographic calls to the customer's telecommunication equipment.

SUMMARY

This invention allows the customer access to the databases located on the network control point (NCP) of a service provider so that the customer can allocate, change and provision internal routing numbers and outpulsed digits for non-geographic calling that are routed to the customer's telecommunication equipment. The service provider continues to make the physical connections between a communication network node, typically a terminating switch and the customer's telecommunication equipment. Typically, the customer's telecommunication equipment is a PBX system. The customer would access the service provider's provisioning databases for non-geographic calling on a network control point (NCP) and would search for specific trunk names assigned to the customer. The customer could then direct the network changes necessary to complete their calls on the service provider's network. Once the routing numbers and the outpulsed digits are assigned by the customer, the new trunk group names and associated internal routing numbers are broadcast to the communication network to update the call routing systems on the network. All of the switches connected to the communication network automatically build appropriate translations to point non-geographic calling traffic to a node on the communication network that functions as the customer's terminating switch.

As operating conditions change for the customer, the customer will have the ability to update the provisioning information on a real-time basis, if necessary. This process reduces the chance for defects in the provisioning data and order transcription and reduces costs due to the decrease in cycle time for service provider provisioning of non-geographic calling such as non-geographic calling such as toll-free calling. This invention significantly changes the current direction for telecommunication service provisioning from a service provider focused provisioning to a customer focus/control of provisioning their own service.

BRIEF DESCRIPTION OF THE DRAWINGS

The summary of the invention, as well as the following detailed description of preferred embodiments, is better understood when read in conjunction with the accompanying drawings, which are included by way of example, and not by way of limitation with regard to the claimed invention.

DETAILED DESCRIPTION OF PREFERRED EMBODIMENTS

Figure 1:
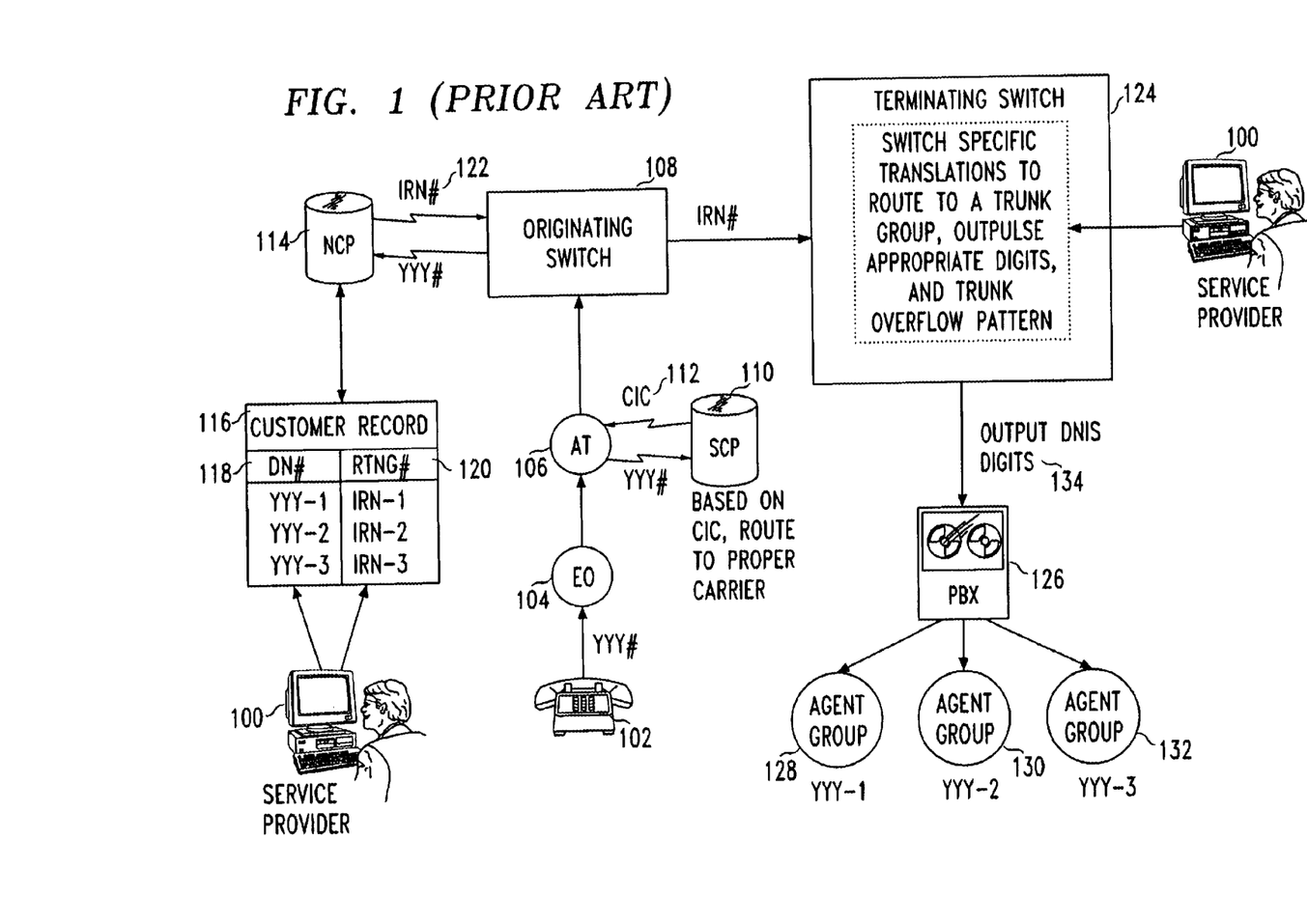
FIG. 1 illustrates the prior art process of call provisioning for non-geographic calling on a communication network.

FIG. 1 illustrates the prior art process of the service provider supporting call provisioning of non-geographic calls on a network. In the prior art process, the service provider 100 provisions the switches on the network for call routing of the non-geographic calls such as calls, and calls to 500, 700 and 900 numbers. Non-geographic calling are calls made to those numbers beginning with a 1-YYY prefix where the YYY does not represent the location of a switch. Examples of this dialed number representation include 500 (personal number designation), 700 (data services designation), 800 (toll-free calling designation), 877 (toll-free calling designation), 888 (toll-free calling designation) and 900 (calling party billing designation) area codes. Some interexchange carriers might designate other 1-YYY numbers in addition to these sequences of area codes for non-geographic related calling.

When a user 102 places a non-geographic designated call, the call is connected to an end office 104 that supports a plurality of users 102. The end office 104 is connected to either an access tandem switch 106 that is in turn connected to an originating switch 108 or the end office 104 is connected directly to the originating switch 108 (not shown). The access tandem switch 106 interfaces with a service control point (SCP) 110 so that routing information can be exchanged ensuring that the proper interexchange carrier is utilized. The carrier identification code 112 obtained from the SCP 110 is transmitted to the access tandem switch 106 so that the 1-YYY non-geographic call can be sent on the proper interexchange carrier's communication network.

When the originating switch 108 receives a non-geographic call from a user 102, the originating switch 108 transmits the called number digits to a network control point (NCP) 114. The NCP 114 accesses the customer record 116 corresponding to the non-geographic called number from a database typically located within the NCP 114 that contains customer data regarding the non-geographic called number. The customer record 116 contains data on the non-geographic dialed number digits 118, the internal routing numbers (IRN) 120 and other information regarding that customer. Currently, the customer's data within the customer record 116 is provisioned, maintained and serviced by the service provider 100. This information is required because the non-geographic call contains no geographic routing information regarding the call. The customer data can contain information well known by those skilled in the art such as the time of day routing scheme or other commonly known processes for routing the non-geographic dialed number to different IRNs 120. Time of day routing causes the NCP 114 to route the 1-YYY call to a first IRN 122 during certain times of the days and to a second IRN 122 during other times of the day. An alternative process could be based on call volume. If the call volume to the non-geographic dialed number is sufficiently high to warrant placing the caller into a queue when routing the call to a first IRN 122, then instead of placing the calls into a queue, the NCP 114 routes the non-geographic dialed number to a second IRN 122.

After the NCP 114 obtains the toll call routing number from the customer record 116 in the database, the NCP 114 transmits an IRN 122 to the originating switch 108. The originating switch 108 transmits the call to a network node that functions as a terminating switch 124. The service provider 100 provisions the network node or terminating switch 124 so that the incoming IRNs 122 are routed to assigned trunk groups, outpulses the appropriate digits and handles trunk overflow patterns.

Connected to the network node or terminating switch 124 typically is customer equipment such as a PBX system 126. The PBX system 126 routes the MRN 122 to the assigned agent group 128, 130 or 132 by the automated attendant feature on the PBX system 126. The different agent groups 128, 130 or 132 could be represented in a computer company by agent group 128 (technical support), agent group 130 (individual sales) and agent group 132 (government sales).

Currently, the basic format for the internal routing number is SSS-TTT. The first two digits of the internal routing number indicate the destination switch for the call. For example, if the routing number was 979, the routing number 979 could be assigned to a switch in downtown Chicago, Ill. The next three digits, indicated by the symbol TTT, indicates the trunk group assigned to the switch. If the routing number was 979-001, the call would be routed to the 979 switch located in downtown Chicago, Ill. and along the trunk group associated with the 001 TTT. The PBX system connected to the first trunk group 001 may have operators assigned to receive incoming calls from the PBX system. These operators may be tasked to perform different customer support operations classified by the various incoming trunk groups 128, 130 and 132.

The PBX system 126 can also provide automatic number identification (ANI) to the assigned agent groups 128, 139 or 132. ANI allows the called party to receive data regarding the calling number. This data can include information regarding prior call history of the calling party to the called number as well as more specific information, such as the type of products purchased by the calling party from the party supporting the 1-YYY number.

The PBX system 126 receives the dialed number identification service (DNIS) 134 data from the network node or terminating switch 124 providing additional information regarding the incoming non-geographic call. An example of this level of customer support by ANI is for a computer company. The computer company maintains a non-geographic technical support number. When a customer of the computer company calls the non-geographic technical support number, ANI supplies the customer's calling number to the computer company's database. When a technical support representative answers the call, the technical support representative has on a computer screen the customer's name, address, previous product purchases, specifications on the products the customer purchased from the computer company and the call history of the customer regarding the company products owned by the customer.

Figure 2A:
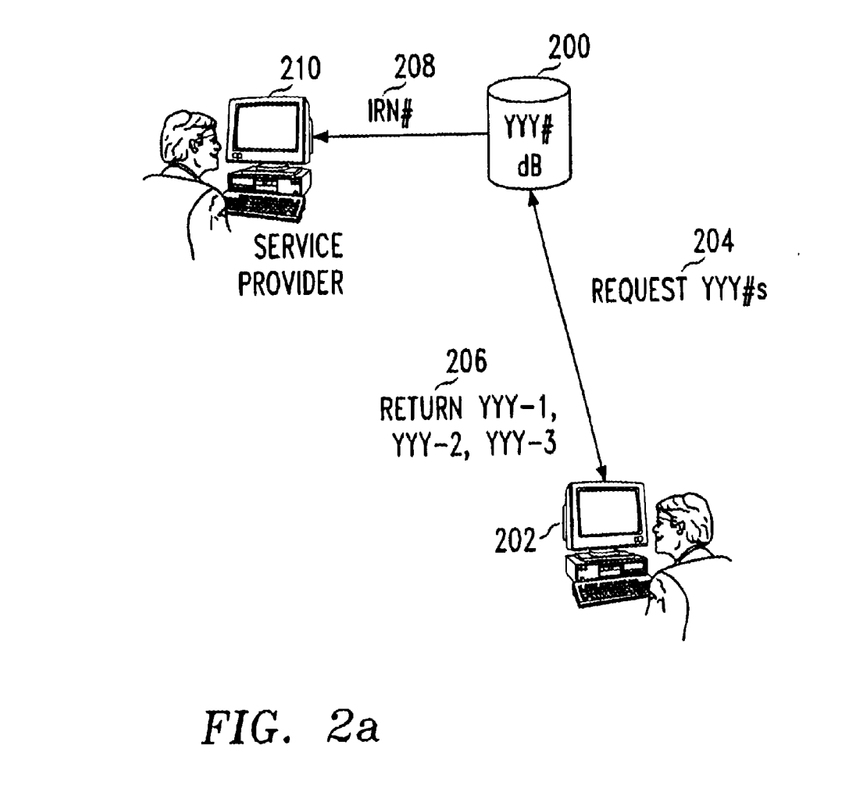
FIG. 2a illustrates the provisioning of data by the customer.

FIG. 2a illustrates the customer performing the provisioning of the NCP databases 200 with information required for the network to route the non-geographic call. The customer 202 requests a non-geographic number 204, 1-YYY-1 from a service provider's communication network. In some instances, the customer 202 will require more than one non-geographic 1-YYY number (1-YYY-2 and 1-YYY-3) or will require another non-geographic number because the first number requested is already reserved by another customer. The customer's request 204 is typically made from the customer's communication equipment 202 to the service provider's network provisioning database 200. The network assigns 206 an available non-geographic number 1-YYY based on the customer's request if the 1-YYY non-geographic number is available. Once the customer 202 has modified obtained the 1-YYY non-geographic number, the IRN 208 is updated in the service provider's records 210.

For example, a customer might request a non-geographic number such that the non-geographic number spells out a trademark, service mark or some other term for callers to identify the non-geographic number to the customer. If the customer requests a non-geographic telephone number such as the toll-free number 1-800-GET-LOST for map services, the number 1-800-GET-LOST corresponds to the dialed digits 1-800-438-5678. If the toll-free number 1-800-438-5678 was previously assigned to customer two, then customer one must select another slogan to correspond to the desired 1-YYY dialed number.

Figure 2B:
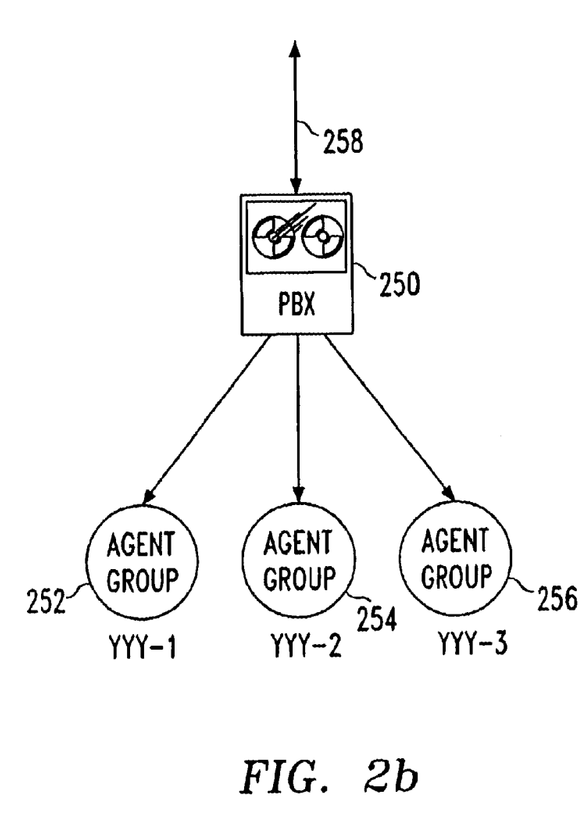
FIG. 2b illustrates the assignment of trunk names to the agent groups by the customer.

FIG. 2b illustrates the customer provisioning of the PBX system 250. The customer requests trunk group connectivity from the service provider so that the trunk groups can be physically connected to the PBX system 250. Typically, the service provider will continue to maintain and establish the physical connectivity 258 of the PBX system 250 to the service provider's other network nodes and/or terminating switches, but the customer will establish the provisioning of the data for the various signaling and routing systems. The customer will also support and provision the routing for the various agent groups 252, 254 and 256.

Figure 3:
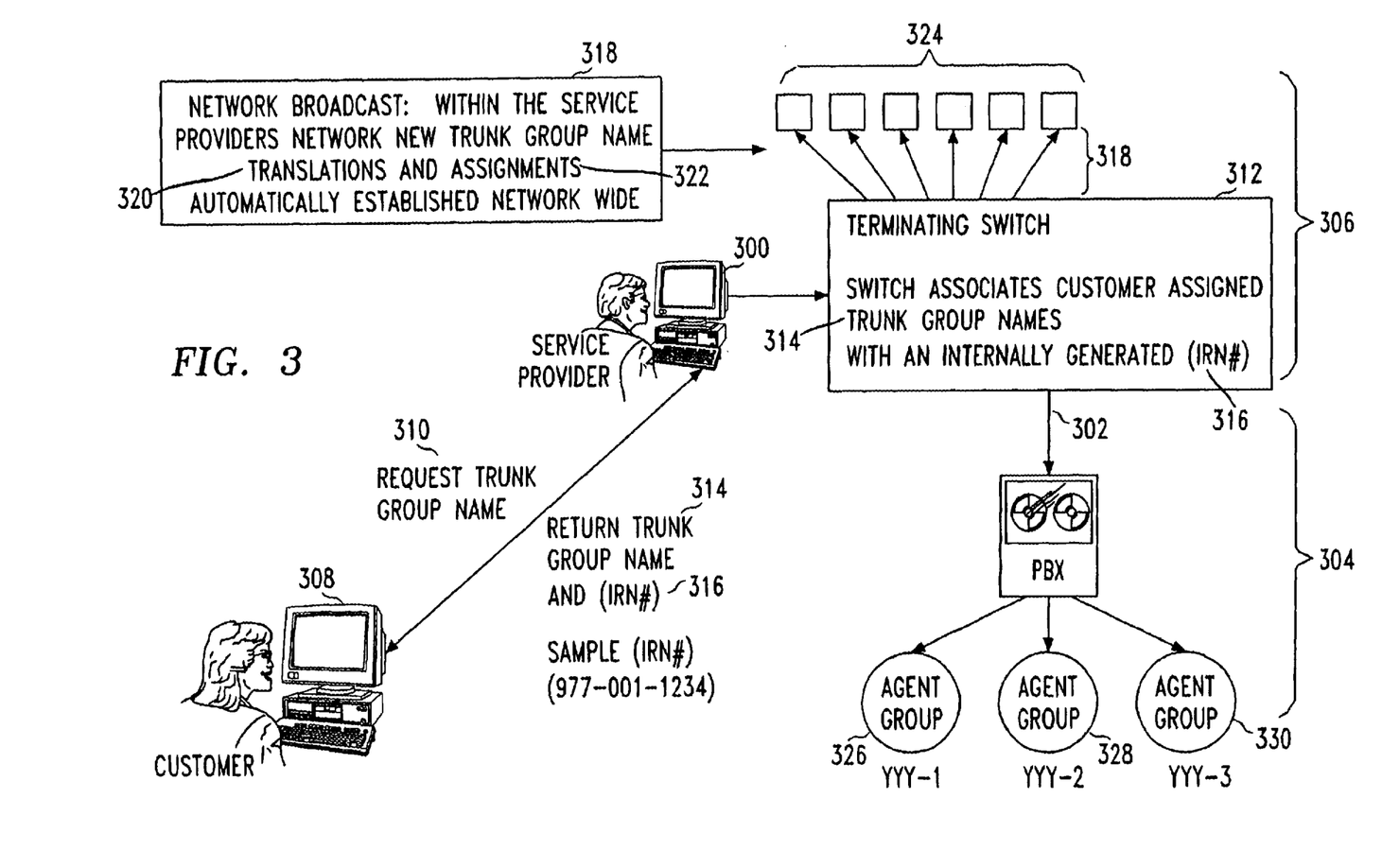
FIG. 3 illustrates the customer provisioning of new trunk group names.

FIG. 3 illustrates a customer system in accordance with the invention for establishing the trunk groups for the 1-YYY calls. After the service provider 300 has completed the physical connections and established the physical connectivity 302 between the customer's system 304 and the network 306, the customer 308 requests the trunk group names 310 for the trunk groups 302 connected by the service provider 300. The network node or terminating switch 312 returns the trunk group names 314 with their corresponding internally generated IRNs 316 to the customer 308.

Once the trunk group names 314 and internal routing numbers 316 are provisioned by the customer 308, the network node or terminating switch 312 broadcasts 318 the trunk group translations 320 and their assignments 322 to the other network nodes and/or switches 324 that are on the network 304. The communication network nodes and/or switches 324 translate the internal routing numbers automatically upon receiving the broadcast 318. Once the new trunk group names 314 and internally generated IRNs 316 are established on the network 306, the trunk group 302 automatically communicates through the signaling network system that the trunk group 302 exists and its correct location. Therefore, all incoming calls to the network node and/or terminating switch 312 are automatically routed to the requested trunk group agents 326, 328 and 330.

Figure 4:
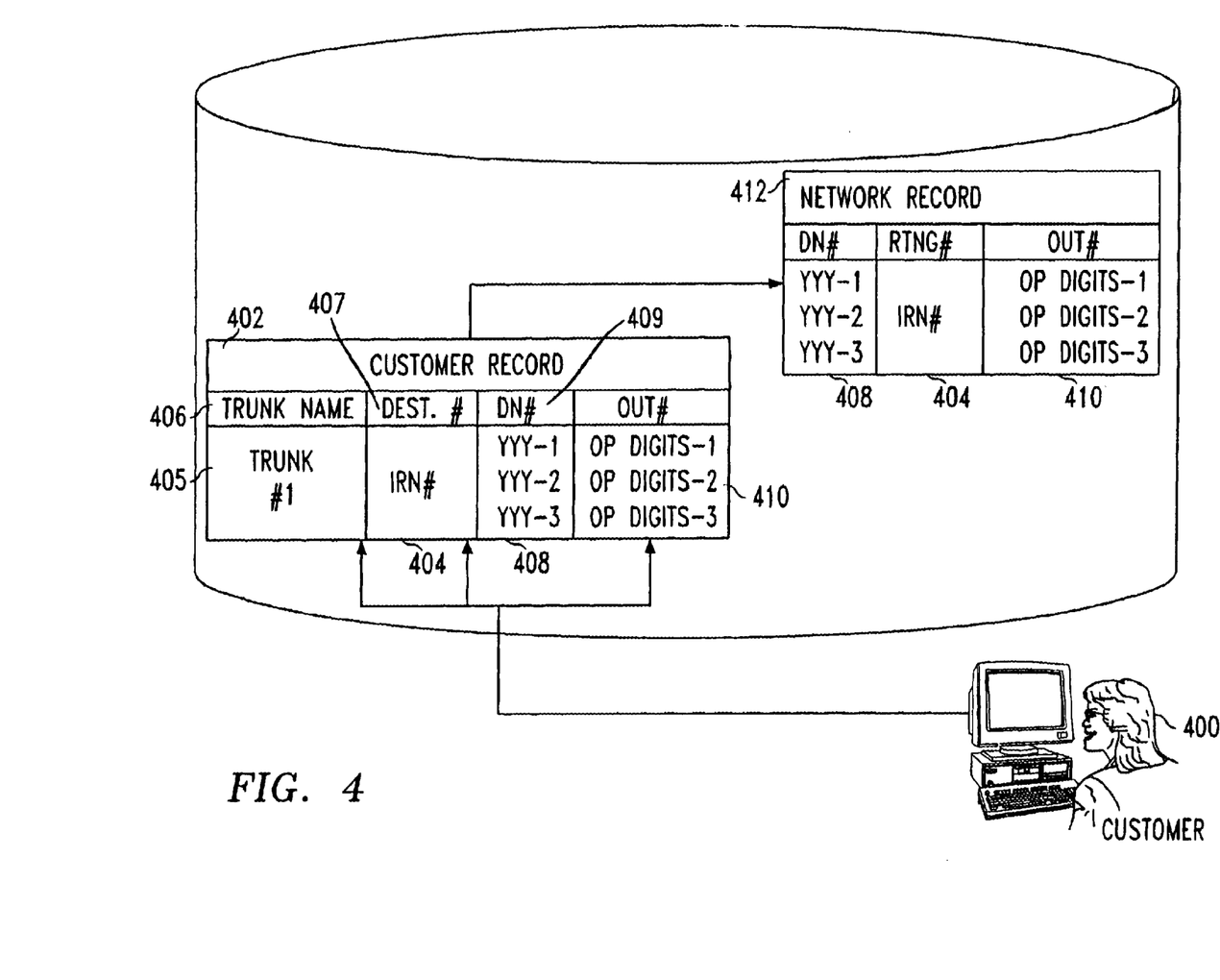
FIG. 4 illustrates the customer provisioning of the internal routing numbers and outpulsed digits in the databases located on the network control point.

FIG. 4 illustrates the customer's system provisioning of the customer and network records contained in the databases supporting the nodes or switches on the communication network. The customer's system 400 accesses the customer's record 402 located in databases maintained at the network control points, and inputs or loads the following information: (1) IRN numbers 404 associated with the trunk names, (2) trunk group names 406 to route the call on; (3) YYY numbers 408 and (4) the associated outpulsed digits 410. It is these outpulsed digits 410 that allow the 1-YYY non-geographic number to be routed to the proper customer agent group destination.

For the trunk name 406, trunk group number one 405 has a destination number 407 corresponding to a dialed number 409 indicated by YYY-1, YYY-2 and YYY-3, (408) etc. with corresponding outpulsed digits 410. Once entered by the customer's system 400, the updated customer records 402 and the network records 412 at the network control point are updated. Although the attributes of the databases may be handled in records that differ from the customer records 402, the data remains the same. The customer's system can then make test calls to determine if the routing and outpulsed digits are correct. If any problems are encountered, the customer can call the service provider for additional assistance. Although the service provider gives up control of the input of the data, the service provider is able to maintain high quality of service across the network because the data input by the customer is cross checked in various reports run by the service provider. This allows the service provider to maintain the integrity of the communication network when customers perform provisioning of various services such as the routing of non-geographic calls.

Quality control and quality of service are maintained by the service provider from error reports generated from the activity of the customer. These reports are cross checked for accuracy and the data input by the customer will produce error messages if the data input by the customer is incorrect or does not support the correct routing of a call. These errors are typically communicated to the customer during the initial provisioning or after the customer has made a request to change a particular provisioning scheme. Adequate security is typically enforced to ensure one customer cannot assign internal routing numbers that could be assigned to other customers.

Figure 5:
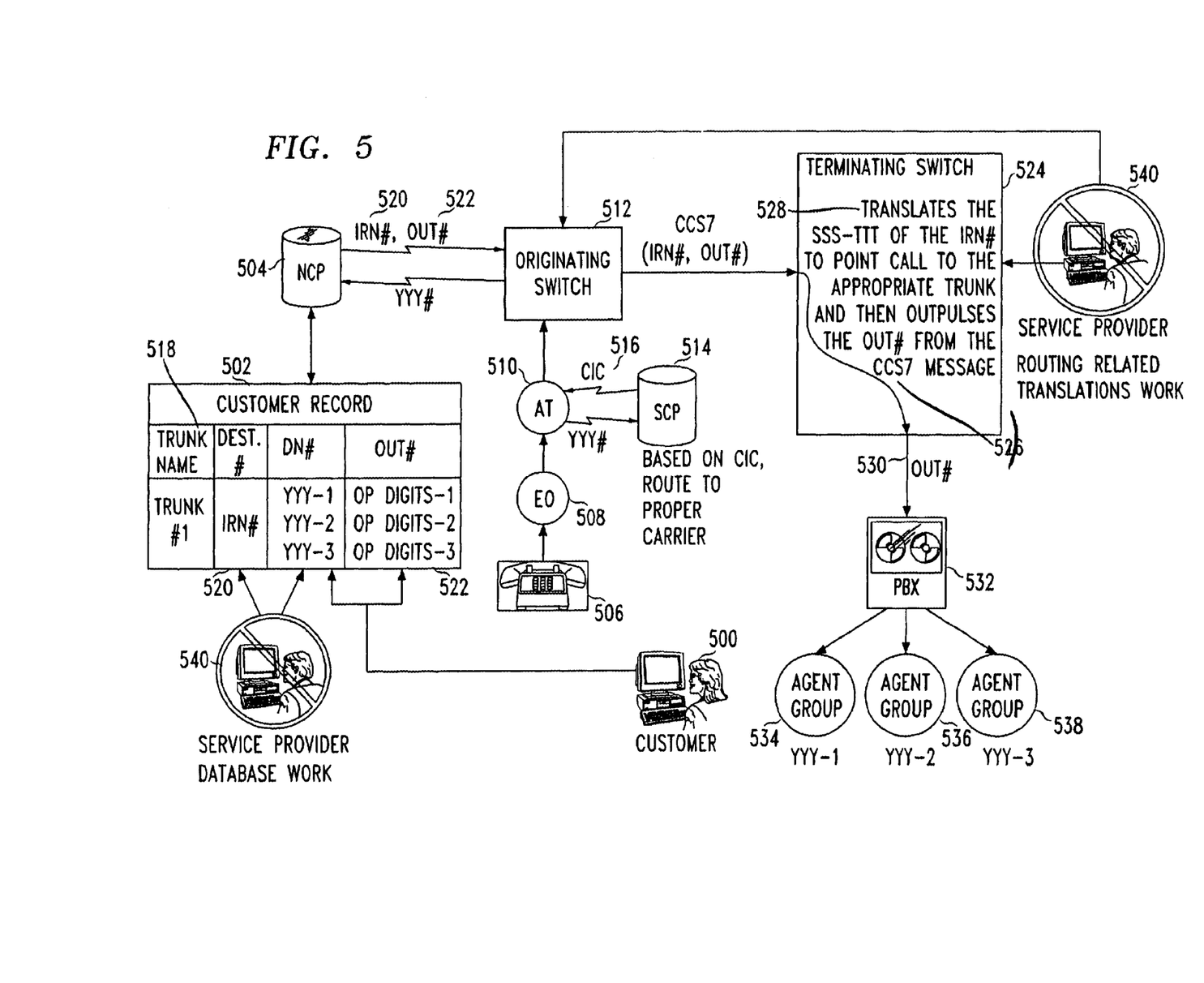
FIG. 5 illustrates a customer system for provisioning the data records supporting the routing of 1-YYY non-geographic calls over a communication network

FIG. 5 illustrates a customer system for provisioning the data records supporting the routing of 1-YYY non-geographic calls over a communication network in accordance with the invention. The customer's system can access the databases on the communication network that routes the non-geographic calls by the customer's communication network system 500, which is typically a computer or PBX equipment. The customer's system 500 provisions and supports the customer routing information 502 contained in the databases located on the NCP 504.

When a user 506 calls a non-geographic number of the customer, the non-geographic call is routed to the end office 508 that supports the user 506. The end office 508 is connected via an access tandem switch 510 to an originating switch 512. In some cases, the end office 508 might be connected directly to the originating switch 512 (not shown). In either case, a message is sent at some point, typically from the access tandem switch 510, to a service control point 514. The service control point 514 assigns a carrier information code (CRC) 516 to the call. The CRC 516 designates the interexchange carrier that will transmit the non-geographic call.

Once the non-geographic call is received by the originating switch 512, the 1-YYY non-geographic number is sent to the network control point (NCP) 504. The network control point 504 accesses the customer record 502 assigned to the 1-YYY non-geographic call. The customer record 502 contains the necessary routing information for the non-geographic call to be transmitted to its end destination. During the provisioning process, the customer 500 can modify the trunk names 518 and the outpulsed digits 520 corresponding to the 1-YYY non-geographic call. For example, as the customer's traffic changes, experiences congestion or routing problems due to natural disasters, the customer 500 can dynamically alter the provisioning information for all of the non-geographic calling numbers routed to that customer's 500 communication equipment.

Once the internal routing number (IRN) 520 and the outpulsed digits 522 are assigned to the routing information of the 1-YYY non-geographic call in the database, the non-geographic call is compared to the data in the customer record 502. When the non-geographic call matches the 1-YYY number in the customer record 502, the NCP 504 assigns the outpulsed digits 522 to the non-geographic call and routes the call to the network node or terminating switch 524. As the call is routed, both the IRN numbers and the outpulsed digits are sent via Common Channel Signaling 7 (CCS7) signaling 526.

The terminating switch 524 automatically routes the non-geographic call to the appropriate outgoing customer trunk, thus eliminating the service provider or customer from having to provision any terminating translation data. The terminating switch 524 automatically routes the call by keeping an internal list of all trunk types 530 connected to the PBX systems 532 connected to the terminating switch 524 and each trunk group 530 in the list would have the IRN 520 it supports listed on the trunk translation. With the IRNs on the trunks and a switch wide PBX trunk list, the switch is ready to automatically route the incoming call.

The incoming non-geographic call is identified with an IRN 520, the outpulsed digits 522 and an indicator that the non-geographic call has a PBX 532 destination. Based on the PBX type call indicator, the terminating switch 524 queries the PBX trunk list of all the trunk groups connected to the terminating switch 524. The terminating switch 524 matches the incoming IRN 520 with the IRN's provisioned on the trunk groups 530. When a match is found, the terminating switch 524 seizes the trunk group 530 and outpulses the digits from the outpulsed digit field for the PBX to translate.

Overflow between multiple trunks and the same PBX can be accommodated by having the same IRN provisioned on multiple trunks. The terminating switch 524 would pick up all trunks with the matching IRN and would overflow between the matching trunks. The order of overflow preference would be accomplished by IRN order on the trunk groups.

For example, if 973-001-1234 was provisioned on the following three trunk subgroups (TSGs):

| TSG1 IRN | TSG2 IRN | TSG3 IRN |
| --- | --- | --- |
| 973-001-1234 | 973-002-3456 | 973-001-1111 |
| 973-001-1111 | 973-001-1234 | 973-002-3456 |
| 973-002-3456 | 973-001-1111 | 973-001-1234 |

Then the terminating switch 524 would route the non-geographic call to 973-001-1234 to the first TSG1 (number in italics) since 973-001-1234 is in the first position, then to the second TSG2, and finally to the third TSG3.

The network node or terminating switch 524 translates the SSS-TTT internal routing number information 528 from the internal routing number 520 to route the call to the appropriate trunk 530. The outpulsed digits in the CCS7 7 message 526 are then outpulsed to the customer's communication equipment, such as a PBX system 532. The outpulsed digits then route the call to its final destination on the customer's communication network. The PBX system 532 further routes the non-geographic call to one of the agent groups 534, 536 or 538. These agent groups 534, 536 or 538 can represent various departments in an organization as previously described in FIG. 1. The process described in FIGS. 2 through 5 eliminate the requirement for the service provider 540 to provision the routing of non-geographic calls at the NCP 504, originating switches 512 or other network nodes such as the terminating switch 524.

This invention provides cost reduction opportunities to the service provider. Since the customer is provisioning call routing data directly by accessing the communication network, the overhead and operational costs associated with provisioning can be reduced. Also, since this invention uses one internal routing number for all outpulsed digit combinations, the internal routing number assignment/capacity and provisioning savings can be realized. These cost reductions in the service provider's operation allow the service provider to provide customers greater and faster control over their networks as well as price reductions on non-geographic calling services.

This invention will eliminate the need to build any routing translations in the terminating switch. The customer is allowed to associate the TTT to their terminating trunk groups, build the trunk subgroups with a characteristic of the TTT assignment and then have the terminating switch search for the correct trunk subgroup at the call translation time. This eliminates the possible error on the routing datablock either at the time of provisioning or post due to human error.

While exemplary systems and methods embodying the present invention are shown by way of example, it will be understood, of course, that the invention is not limited to these embodiments. Modifications may be made by those skilled in the art, particularly in light of this disclosure. For example, each of the elements of the disclosed embodiments may be utilized alone or in combination with elements of the other embodiments.

What is claimed is:

1. A method for use in a service provider's network, the method comprising receiving a particular telephone number dialed to initiate a call, retrieving from a network control point, maintained by said service provider, particular outpulsed digits assigned to said particular telephone number, said particular outpulsed digits being other than digits of said particular telephone number, routing the call to a customer's communication network associated with the particular telephone number, said routing being independent of said particular outpulsed digits, said particular outpulsed digits identifying a particular destination on the customer's communication network and having been assigned to said particular telephone number by said customer, and providing the retrieved outpulsed digits to said customer's communication network as part of the routing of said call.

2. The invention of claim 1 wherein said particular destination is a particular agent group.

3. The invention of claim 1 wherein said dialed telephone number is a non-geographic telephone number.

4. The invention of claim 1 further comprising receiving from a customer, and storing in said network control point without further human intervention, information that specifies said particular outpulsed digits and associates them with said particular telephone number.

5. The invention of claim 4 wherein said storing comprises storing said information in at least one customer record accessible by said customer and maintained by said service provider, and updating in said network control point at least a first network record associated with said particular telephone number.

6. The invention of claim 4 further comprising receiving from said customer, and storing in said network control point without further human intervention, information that associates said telephone number with a trunk name associated with said at least one trunk line that connects said customer's communication network to said terminating node.

7. The invention of claim 4 further comprising receiving from said customer, and storing in said network control point without further human intervention, information that associates said telephone number with a routing number internal to said network, said internal routing number identifying a terminating node of said network and further identifying at least one trunk line that connects said customer's communication network to said terminating node.

8. The invention of claim 7 further comprising receiving from said customer, and storing in said network control point without further human intervention, information that associates a second telephone number with said internal routing number and that assigns second particular outpulsed digits to said second telephone number, said second telephone number being associated with said customer's communication network, receiving said second telephone number dialed to initiate a second call, retrieving from said network control point said second particular outpulsed digits assigned to said second telephone number, said particular second outpulsed digits being other than digits of said second telephone number, and said second outpulsed digits identifying a second destination on the customer's communication network and having been assigned to said second telephone number by said customer, routing the second call to said customer's communication network, said routing being independent of said second particular outpulsed digits, and providing the retrieved second outpulsed digits to said customer's communication network as part of the routing of said second call.

9. A method for use in a communication service provider's network that routes calls to particular customer premises equipment via a terminating node and at least one trunk line that connects said customer premises equipment to said terminating node, the method comprising, receiving from a customer, and storing in a network control point, information identifying a) said at least one trunk line, b) at least one non-geographic telephone number associated with said at least one trunk line, and c) for each said associated telephone number, outpulsed digits that are assigned to that telephone number by said customer, but are other than digits of that telephone number, receiving a telephone number dialed to initiate a call, said dialed telephone number being one of the telephone numbers stored in said network control point, utilizing said dialed telephone number to retrieve from the network control point the information identifying the associated at least one trunk line and further identifying said outpulsed digits assigned to said dialed telephone number, and utilizing the retrieved information identifying said at least one trunk line to route the call to said terminating node and to provide the identified outpulsed digits to said terminating node, said terminating node thereupon routing the call to said customer premises equipment via the identified at least one trunk line, said terminating node outpulsing the identified outpulsed digits to said customer premises equipment, the routing of said call to said terminating node and the routing of said call to said customer premises equipment being independent of said identified outpulsed digits.

10. The invention of claim 9 wherein said information identifying said at least one trunk line is a trunk name.

11. The invention of claim 9 wherein said information identifying said at least one trunk line is an internal routing number including a first portion that identifies said terminating node from among other terminating nodes of said service provider's network and further includes a second portion that identifies said at least one trunk line from among other telephone trunk lines extending from said terminating node.

12. The invention of claim 9 wherein said customer premises equipment is a private branch exchange (PBX) that routes said call to a selected agent as a function of the digits outpulsed from said terminating node.

13. A method for use in a communication service provider's network that routes calls to particular customer premises equipment via a terminating node and at least one trunk line that connects said customer premises equipment to said terminating node, the method comprising, receiving from a customer, and storing in a network control point without further human intervention, information identifying a) said at least one trunk line, b) a plurality of non-geographic telephone numbers associated with said at least one trunk line, and c) for each identified telephone number, outpulsed digits that are assigned to that telephone number by said customer and are other than digits of that telephone number, receiving a telephone number dialed to initiate a call, said dialed telephone number being one of said plurality of telephone numbers stored in said network control point, utilizing said dialed telephone number to retrieve from the network control point the information identifying said at least one trunk line and further identifying the outpulsed digits assigned to said dialed telephone number, and utilizing the retrieved information identifying said at least one trunk line to route the call to said terminating node and to provide the identified outpulsed digits to said terminating node, said terminating node thereupon routing the call to said customer premises equipment via the identified at least one trunk line, said terminating node outpulsing the identified outpulsed digits to said customer premises equipment, the routing of said call to said terminating node and the routing of said call to said customer premises equipment being independent of said identified outpulsed digits.

14. The invention of claim 13 wherein said information identifying said at least one trunk line is a trunk name.

15. The invention of claim 13 wherein said information identifying said at least one trunk line is an internal routing number including a first portion that identifies said terminating node from among other terminating nodes of said service provider's network and further includes a second portion that identifies said at least one trunk line from among other telephone trunk lines extending from said terminating node.

16. The invention of claim 13 wherein said customer premises equipment is a private branch exchange (PBX) that routes said call to a selected agent as a function of the outpulsed digits.

* * * * *